United States Patent Office

3,499,837
Patented Mar. 10, 1970

3,499,837
WASTE WATER TREATMENT PHOSPHATE
REMOVAL BY IRON OXIDE
Karlis Laimonis Jaunarajs, Somerville, N.J., assignor to Johns-Manville Corporation, New York, N.Y., a corporation of New York
No Drawing. Filed Nov. 20, 1967, Ser. No. 684,474
Int. Cl. C02c 5/02; C02b 3/06, 1/18
U.S. Cl. 210—59
12 Claims

ABSTRACT OF THE DISCLOSURE

Phosphate is removed from waste water by contacting the waste water with a water-insoluble composition comprising hydrous iron oxide coated on a particular support. The composition can be formed by precipitating iron oxide from an aqueous iron salt solution on a porous support, or by activation of iron ore. The composition can be regenerated with alkali.

BACKGROUND OF THE INVENTION

This invention relates to waste water treatment processes and compositions, and more particularly to processes and compositions for the removal of phosphate from waste water.

The presence of phosphate in surface waters poses a major water pollution problem. Even small amounts of phosphate promote the proliferation of algae in quiescent bodies of water such as lakes and slow-flowing streams. The discharge of phosphate laden sewage effluent into surface water, and the subsequent runoff of these waters into lakes, will establish a phosphate concentration high enough for growth of algae. The surface water runoff from fields fertilized with inorganic phosphates may also have a phosphate concentration sufficient to promote the growth of algae. The presence of algae in lakes and other relatively quiet bodies of waters upsets the oxygen balance, causing the oxygen level to drop to an abnormally low level at night when photosynthesis is not taking place and the algae are absorbing oxygen from the water. Dying algae also consume oxygen and cause a drop in the oxygen level of the water. The presence of large quantities of algae in a body of water also give the water a slimy and unsightly appearance, and frequently introduces undesirable odors, taste, and color which are difficult to remove by the usual purification methods.

A typical effluent from the secondary treatment of the municipal sewage treatment system may contain approximately 10–30 p.p.m. of phosphate, expressed as $PO_4^{-3}$. This phosphate level is high enough to establish a phosphate level in a lake or pond which will cause the growth of algae.

The major sources of phosphate in municipal sewage are human waste and detergents. The former contributes organic phosphates, which are broken down in primary and secondary sewage treatment to the water soluble orthophosphate ion. The phosphates in detergents are very largely in the form of complex phosphates, such as tetrasodium pyrophosphate, sodium tripolyphosphate, and sodium hexametaphosphate. These are to a great extent hydrolyzed to the orthophosphate ion during the course of sewage treatment. The orthophosphate ion is stable, and is not susceptible of either chemical or biological attack. The orthophosphate ion passes unchanged through conventional sewage treatment procedures.

Various procedures for removal of inorganic phosphate from sewage have been suggested. However, all of these are undesirable, either by reason of cost or because they increase the alkalinity of the waste water effluent excessively. For example, the addition of lime to sewage will remove substantial quantities of phosphate. However, the pH of the waste water soars, generally to above 8 and in some cases to above 10, if sufficient lime for effective phosphate removal is added. Precipitation of phosphate by the addition of a water-soluble ferric salt such as ferric sulfate has been suggested, but the addition of sulfate causes an undesirable increase in dissolved solids.

Prior to this invention there has not been any process which will economically remove the orthophosphate ion from water without unduly raising the pH, or adding an unwanted ion which increases the hardness of the water. Furthermore, there has not been any phosphate removal process capable of being carried out on a large scale at reasonable cost. The present invention provides a new phosphate removal process which can be carried out economically on a large scale in a municipall system, and which does not have any appreciable effect on the pH of the effluent water, nor does it increase the hardness of the water.

It is an object of this invention to provide a process for the removal of phosphate from waste water without substantial increase in the pH or the hardness or the water.

This and other objects will be apparent from the description which follows.

SUMMARY

According to the present invention, waste water containing phosphate ion is contacted with a composition comprising a coating of activated hydrous ferric oxide on the surface of a particulate support. This composition is formed in advance, and then used to remove phosphate by contacting water containing phosphate with the composition. This procedure reduces the orthophosphate ion concentration without unduly raising the pH or adding an unwanted ion to the water. The hydrous iron oxide may be contacted with water to be treated according to conventional procedures, such as passing the water to be treated through a column of the hydrous iron oxide, or slurrying the hydrous iron oxide in the water to be treated. The supported hydrous iron oxide is regenerated with aqueous alkali such as sodium hydroxide.

DETAILED DESCRIPTION

Phosphate is removed from waste water according to this invention by contacting the waste water with a novel, water-insoluble treating agent which includes activated hydrous ferric oxide. This treating agent is capable of removing substantially all phosphate present without the addition of any extraneous anions to the waste water.

The treating agent of this invention is a supported hydrous ferric oxide comprising a particulate support having a surface coating of hydrous ferric oxide. The hydrous ferric oxide may also be considered to be ferric hydroxide. The support may be an inert material, such as a filter aid which has iron oxide precipitated on its surfaces; or may be iron ore whose surfaces have been activated by acid treatment.

One of the methods for preparing hydrous iron oxide for use in the present invention is to precipitate the material from an aqueous solution of a ferric salt such as ferric sulfate. Precipitation is carried out by adding an alkaline material, such as sodium carbonate, sodium hydroxide, lime, or magnesium oxide, to the ferric salt solution.

Industrial ferric salt solution can be used to advantage, even though the solutions may contain impurities. Waste pickle liquor solutions and acid mine waters containing iron salts can be used, even though the latter contain appreciable quantities of impurities such as calcium, magnesium, and aluminum salts. Ferrous salt solutions can also be used, in which case the ferrous salt can be oxidized to the corresponding ferric salt by a known method such as air oxidation. The concentration of iron in the ferric salt solution may vary within wide limits.

Precipitation of hydrous ferric oxide is most advantageously carried out in the presence of an inert high surface area substrate which serves as a support for the precipitate. Commercial filter aids are especially well suited to this purpose. The hydrous iron oxide coats the surfaces of the filter aid particles, forming a composite structure in which the filter aid particles serve as the base or support and the hydrous iron oxide forms a coating thereon. Iron oxide coated on a filter aid in this manner has a greater capacity for removing phosphate ions from water than does an equal weight of unsupported hydrous iron oxide. Capacity refers to the amount of orthophosphate ions removed from water per unit weight of iron oxide. Another advantage of supported iron oxide is that it is much easier to handle than unsupported iron oxide. A filter aid is a particularly desirable support because the filter aid greatly facilitates the filtration of freshly precipitated iron oxide. Iron oxide is a highly gelatinous precipitate, which quickly causes "blinding" or plugging of the filter when no filter aid is used.

Diatomaceous silica filter aids have been found to give excellent results. Good results are achieved with a coarse, high flow rate filter aid such as "Celite" 545, which is made and sold by Johns-Manville Products Corp., New York, N.Y. Other diatomaceous earth filter aids, and filter aids such as perlite, can be used, if desired.

The supported iron oxide products of this invention may have any desired ratio of iron oxide to filter aid. Supported products containing from about 5% to about 50% by weight of hydrous iron oxide, balance filter aid, have been found particularly desirable. However, compositions containing either greater or smaller amounts of iron oxide can be used.

High surface area is important for maximum effectiveness of supported iron oxide compositions. Compositions containing comparatively small amounts of iron oxide have been found more effective on the basis of the weight of iron oxide present than those containing large amounts of iron oxide. For example, a product containing about 7% of iron oxide gives greater phosphate removal per unit weight of $Fe_2O_3$ than does a product containing about 36% $Fe_2O_3$. This appears to be due to the fact that the iron oxide in the former is in the form of a thin layer with a substantial portion exposed, while the iron oxide in the latter is in a thicker layer with proportionately less exposed surface.

Another procedure by which hydrous iron oxide useful for removing phosphate from water may be prepared is by acid activation of iron ore. Various iron oxide ores, such as hematite and magnetite, may be used. They are generally crushed to fine particle size, for example, about 10–200 mesh, with best results obtained if the particles are predominantly finer than about 60 mesh. The crushed iron oxide ore is activated by treatment in a hot concentrated solution of a mineral acid. Both hydrochloric and sulfuric acids are well suited to this purpose. Treatment in hot solutions, i.e., those having a temperature from about 60° C. up to the boiling point of the solution, gives good results. The acid is neutralized at the conclusion of the heat treatment until the solution pH is on the alkaline side, and the activated iron oxide may be then recovered by filtration. The product is air dried. The acid treatment apparently forms a surface layer of hydrous iron oxide on an ore substrate.

Both precipitated and acid-activated iron oxides of this invention can be air dried. Oven drying is preferably avoided since this appears to reduce the activity of the material.

Waste water can be contacted with iron oxide either on a batch or continuous basis. In batch operations, the iron oxide, preferably supported on a filter aid, is slurried in the waste water to be treated. The amount of iron oxide is sufficient to remove the phosphate ion present. The purified waste water is separated from the iron oxide by conventional techniques such as decantation or filtration.

A preferred mode of contacting waste water with iron oxide is to pass the waste water continuously downwardly through a bed or column of hydrous iron oxide, preferably supported on a filter aid. The effluent waste water is free of phosphate ions until the capacity of the iron oxide is reached. Then passage of waste water through the bed of iron oxide is stopped and the iron oxide is regenerated.

The supported hydrous iron oxide compositions of this invention can be regenerated and reused. Regeneration of iron oxide is accomplished by contacting the iron oxide with an aqueous solution of an alkaline material such as sodium hydroxide. The iron oxide can be regenerated either by passing the sodium hydroxide regenerant solution through a bed of iron oxide, or by slurrying the iron oxide in the sodium hydroxide solution.

The supported iron oxide appears to remove phosphate by a sorption mechanism, although the mechanism is not certain. The hydrous iron oxide composition has important advantages over precipitants such as derived from ferric sulfate; i.e., the composition herein does not add any extraneous materials to the waste water stream, and it can be regenerated and reused.

This invention will now be described with reference to specific embodiments thereof as illustrated in the following examples.

A phosphate stock solution containing 30 parts p.p.m. of orthophosphate ion was prepared by mixing 416 mg. of $NaH_2PO_4 \cdot H_2O$ and 803 mg. of $Na_2HPO_4 \cdot 7H_2O$ were dissolved in 19 liters of tap water. This solution had a pH of 7.6. A few drops of 1 N HCl were added to reduce the pH to 7.55. This stock solution was used in Examples 1 through 4.

EXAMPLE 1

A suspension containing 115 grams of "Celite" 545 diatomaceous earth filter aid in 900 ml. of tap water at room temperature was prepared. To this suspension was added a solution of 23.0 grams of ferric sulfate in 250 ml. of boiling water. The initial pH of this suspension was 1.7. Anhydrous sodium carbonate was slowly added to the suspension with moderate agitation until a pH of 6.0 was reached. This required 15.0 grams of $Na_2CO_3$. The product was filtered, washed witht 200 ml. of tap water, redispersed in 800 ml. of tap water and washed again. No sulfate ions were detected in the filter cake after the second filtration. The filter cake was allowed to dry overnight at room temperature. This yielded air dry coated products consisting of about 7.4% by weight of hydrous iron oxide coated on the surfaces of "Celite" 545 particles. This material was designated as Sample A.

A second sample of iron oxide-coated diatomaceous earth, designated as Sample B, was prepared in the same way except that it was dried at 115° C. for one hour. The air dry material lost about 2.3% by weight of water, based on the weight of the air dry sample, on drying.

A series of five tests were made to determine the capacity of iron oxide for removal of phosphate ion from water. Test 1 was a control in which no iron oxide was used. In tests 2 through 5, iron oxide coated diatomaceous earth in the amounts indicated in Table 1 below was slurried in 1,000 ml. of the phosphate stock solution. Air dried material (Sample A) was used in tests 2, 3, and 4, and oven dried material (Sample B) was used in test 5. Results were as given in Table 1 below:

TABLE 1

| Test No. | Adsorbent | Amount of adsorbent (g.) | $Fe_2O_3$ content (g.) | $PO_4^=$ mg. present | Percent $PO_4^=$ removed |
|---|---|---|---|---|---|
| 1 | None (control) | 0 | 0 | 29.4 | |
| 2 | Sample A | 0.5 | 0.037 | 25.0 | 15.2 |
| 3 | do | 2.0 | 0.149 | 12.5 | 57.8 |
| 4 | do | 10.0 | 0.74 | 0.0 | 100.0 |
| 5 | Sample B | 2.0 | 0.149 | 20.0 | 32.0 |

It can be seen that the amount of iron oxide in test 4 was more than enough to remove all the phosphate ion present. The percentage removal in test 3 is the best indication of capacity, and on this basis it was determined the phosphate removal capacity is 113 mg. of phosphate per gram of $Fe_2O_3$. Comparison of tests 3 and 5 shows that air dry iron oxide has a much higher capacity for removing phosphates than does oven dry iron oxide.

EXAMPLE 2

One hundred grams of ferrous sulfate was dissolved in 600 ml. of tap water at 70° C. Then 60 grams of "Celite" 545 diatomaceous earth filter aid was dispersed in the solution. Then 300 ml. of tap water was added, dropping the temperature to 45° C. To this suspension was added 67.0 grams of anhydrous sodium carbonate with agitation. The entire experiment was conducted in an air atmosphere, permitting oxidation of the iron to the ferric state. The pH of the suspension rose suddenly from 3.0 to 6.5 and the suspension gelled instantaneously. An additional 300 ml. of water was added for better dispersion of the reactants. The product was then filtered on a Buechner funnel, and redispersed in water and refiltered several times in order to remove sulfate ions from the filter cake. After tests showed that the filter cake was substantially free of sulfate ions, the filter cake was spread out on aluminum foil and allowed to dry at room temperature for 24 hours. The resulting hydrous iron oxide-coated diatomaceous earth contained 36% by weight of hydrous iron (ferric) oxide.

Following the test procedure of Example 1, the phosphate removal capacity of the iron oxide coated diatomaceous earth prepared in this example was evaluated. Three tests were made. Test 1 was a control in which no iron oxide coated diatomaceous earth was used. Different amounts of the iron oxide coated filted aid were used in tests 2 and 3. The amounts of iron oxide coated diatomaceous earth, and the amount of phosphate removal achieved in each case, are shown in Table 2 below.

TABLE 2

| Test No. | Amount of adsorbent (g.) | $Fe_2O_3$ content (g.) | Mg. $PO_4^=$ present | Percent $PO_4^=$ removal |
|---|---|---|---|---|
| 1 | None | | 30.5 | |
| 2 | 0.500 | 0.18 | 16.3 | 46.5 |
| 3 | 0.100 | 0.036 | 26.9 | 11.8 |

The capacity of the iron oxide in this example for removal of phosphate is 79 mg. of phosphate ion (as $PO_4^=$) per gram of iron oxide. Comparison of the capacity of 36% iron oxide on diatomaceous earth in this example with 7.4% iron oxide on diatomaceous earth in Example 1 shows that the capacity of the iron oxide in this example is appreciably lower than that in Example 1. This shows that a greater capacity for phosphate removal per unit weight of iron oxide is achieved in coated products having relatively small percentages of iron oxide.

EXAMPLE 3

A 3.5 gram sample of iron oxide on "Celite" 545 (0.25 g. $Fe_2O_3$) was placed in a beaker containing one liter of phosphate solution (pH 7.5) containing 30.5 p.p.m. of phosphate as $PO_4^{-3}$. The suspension was slowly stirred for fifteen minutes and filtered under vacuum. The solid material collected on the filter was transferred back to the beaker. This procedure was repeated two more times. The three filtrates were collected separately and the amount of phosphate in each determined. The amounts of phosphate and percentages of phosphate removed from the three filtrates are given in Table 3 below.

TABLE 3

| Filtrate No. | $PO_4$ present, p.p.m. | Percent $PO_4$ removed |
|---|---|---|
| 3 | 10 | 67.2 |
| 1 | 25 | 18.0 |
| 2 | 27 | 11.5 |

The spent iron oxide on "Celite" 545 was regenerated with aqueous sodium hydroxide. The solid was placed on the plate of the vacuum filter. Then 15 ml. of 0.5 M NaOH was poured into the funnel of the filter with the vacuum turned off, allowed to stand five minutes, and removed under vacuum. The filter cake was then washed with dilute sodium hydroxide, dilute nitric acid, and water.

The regenerated iron oxide composition was used to remove phosphate ions from water as described earlier in this example. The regenerated solid was transferred from the filter to a beaker. Three one-liter aliquots of phosphate stock solution containing 30.5 p.p.m. of phosphate were added successively to the beaker. Each was stirred for fifteen minutes and removed by vacuum filtration. The phosphate content of each aliquot after filtration was determined. Results are given in Table 4 below.

TABLE 4

| Aliquot No. | $PO_4$ present, p.p.m. | Percent $PO_4$ removed |
|---|---|---|
| 1 | 16 | 48 |
| 2 | 27 | 11.5 |
| 3 | 28 | 8.2 |

EXAMPLE 4

An absorption tube having an inside diameter of 31 mm. and a height of 22 inches was filled with a slurry prepared by mixing 200 ml. of distilled water with 20.0 grams of iron oxide on silica (about 7.2 $Fe_2O_3$) prepared according to the procedure of Example 1. The solids were allowed to settle and the water was drained off. This gave an absorbent column 7.7 centimeters high.

The phosphate stock solution containing 30 p.p.m. of phosphate ion was passed through the absorption column in 4 aliquots of 250 ml. each followed by 14 aliquots of 500 ml. each. The amount of phosphate in the effluent of each eliquot was determined. The flow rate through the column in all cases was between 14 and 20 ml. per minute. No phosphate was detected in the effluent of the first nine aliquots, having a combined volume of 3.5 ml. A trace of phosphate ion was detected in the tenth aliquot, and substantial quantities of phosphate were detected in all subsequent aliquots. Breakthrough occurred after 3.5 liters. The capacity of the iron oxide in this experiment was 89 milligrams of phosphate ion removed for each gram of $Fe_2O_3$.

EXAMPLE 5

The column of iron oxide used in Example 4 was regenerated as follows: 120 ml. of 1 M NaOH was poured into the column and retained there for ½ hour with the stopcock closed. The stopcock was then opened, and the drainage time was ½ hour, giving a total contact time of one hour. The column was then washed with 60 ml. of tap water, treated with a second 120 ml. portion of 1 N sodium hydroxide, and then again washed with 60 ml. of tap water followed by 120 ml. of dilute nitric acid (pH4), followed by two 120 ml. portions of water.

Phosphate solution containing 30 mg. of phosphate per liter was passed through the column of regenerated iron oxide on diatomaceous earth. The flow rate ranged from 15 to 17 ml./min. Breakthrough of phosphate occurred after 1.5 liters. A total of 8 liters of phosphate solution was passed through the column. The amount of phosphate removed was 95 mg. This corresponds to a capacity of 66 mg. of phosphate ions per gram of $Fe_2O_3$. This shows that regenerated iron oxide has a lower capacity than fresh iron oxide.

The iron oxide was again regenerated as described above. Phosphate removal capacity of the twice regenerated iron oxide was tested according to the procedure of Example 3. Breakthrough occurred after 2 liters of phosphate solution had been passed through the column. This indicates that there is no further loss of capacity on further regeneration.

EXAMPLE 6

A concentrated sludge obtained by neutralizing acid mine waters containing dissolved iron salts and having a solids content of 1.33% was used in making the iron oxide for the tests of this example. This iron oxide sludge had a composition on the dry basis as follows:

| | Percent |
|---|---|
| $CaSO_4$ | 40 |
| $MgSO_4$ | 5.0 |
| $CaO$ | 3.0 |
| $MgO$ | 1.0 |
| $Fe_2O_3$ | 15.0 |
| $Mn_2O_3$ | 4.0 |
| $SiO_2$ | 20.0 |
| $Al_2O_3$ | 12.0 |
| Total | 100.0 |

The material as received was allowed to settle for 24 hours, then the supernatant liquid, constituting about ½ of the volume, was poured off. The remaining suspension was then placed in a centrifuge and centrifuged for about 15 minutes at low speed. Again, about half of the volume was poured off. This yielded a centrifuge slurry having a solids content of 6.3% by weight.

Three portions of iron oxide sludge, weighing 2.5 grams, 5.0 grams, and 10.0 grams respectively, were placed in separate beakers, each containing one liter of treated municipal waste water having a phosphate ion content of 27.6 p.p.m. The suspensions were agitated for fifteen minutes, then filtered under vacuum. The residual phosphate in the filtrate was determined by spectrophotometric methods. A fourth beaker, also containing one liter of waste water, was run as a control. Test results are shown in Table 5 below.

TABLE 5

| Test No. | Iron oxide sludge (g.) | pH of filtrate | p.p.m. $PO_4^{\equiv}$ | Percent $PO_4^{\equiv}$ removed |
|---|---|---|---|---|
| 1 | 2.5 | 8.63 | 16.0 | 41.8 |
| 2 | 5.0 | 7.81 | 11.8 | 57.2 |
| 3 | 10.0 | 7.73 | 5.3 | 81.0 |
| Control | 0 | 8.02 | 27.6 | 0 |

The phosphate removal capacity of the iron sludge, based on test 3, was 168 mg. of phosphate ion per gram of $Fe_2O_3$.

EXAMPLE 7

Ten-gram quantities of crushed Labrador hematite and Cornwall magnetite iron ores were weighed out and placed in a beaker. Each of these samples was digested in 30 ml. of 2.5 N HCl at 80° C. for 30 minutes. After heating, 5 ml. of water was added, and then the acid was neutralized with 5 N NaOH to a pH of about 7.5 to 8. The iron ore was filtered, washed with water, and dried at room temperature.

The acid-treated ores were used to remove phosphate from a stock solution containing 30.8 p.p.m. of phosphate (pH 7.5). Ore samples were weighed out and placed in beakers. Then 500 ml. of the phosphate solution was added to each beaker. Each suspension was stirred slowly for 15 minutes and then vacuum filtered. All filtrates had a pH of about 7.9. The phosphate content of each filtrate was determined. Results are reported in Table 6 below. Particle sizes in this table are U.S. standard sieve mesh openings.

TABLE 6

| Test No. | Ore | Particle size | Weight (g.) | $PO_4$ in filtrate, p.p.m. | Percent $PO_4$ removed |
|---|---|---|---|---|---|
| 1 | Hematite | −14−+20 | 0.5 | 20.5 | 33.3 |
| 2 | do | −14−+20 | 0.5 | 16.0 | 48.0 |
| 3 | Magnetite | −60 | 0.5 | 23.5 | 23.5 |
| 4 | do | −60 | 1.0 | 18.7 | 39.2 |

Hematite which had not been activated was found to have virtually no phosphate removal activity in a test procedure similar to that described above.

The capacity for removal of phosphate ions from natural waste water is greater than the capacity of the same materials for removal of phosphate ions from synthetic waste water (i.e. the phosphate stock solution containing 30 p.p.m. of phosphate ion). The reason for this is not fully understood. Although the numerical values of phosphate removal are slightly different for natural and synthetic waste waters, the synthetic waste water determination nevertheless furnishes a reliable guide as to the value of the material for removing phosphate from natural waste waters such as those encountered in streams polluted by municipal and industrial waste.

The present invention provides a reliable and efficient process for removal of phosphate ion from waste water. This provides a long sought solution to the problem of removing phosphate ions, which has long been one of the most difficult to remove of the commonly encountered stream pollutants.

It will be understood that the foregoing description is by way of illustration and not by way of limitation of the invention.

What I claim is:

1. A process for removing phosphate ions from a water solution thereof, comprising forming hydrous iron oxide precipitate substantially free of salt anions, and thereafter sufficiently contacting said hydrous iron oxide precipitate with said phosphate ions to remove contacted phosphate ions from said solution.

2. A process according to claim 1, including passing said water solution through a bed comprising substantially said hydrous iron oxide precipitate.

3. A process according to claim 1, in which said hydrous iron oxide precipitate is supported on a particulate substrate having a particle size ranging substantially from about 10 to about 200 mesh;

4. A process according to claim 1, in which said hydrous iron oxide precipitate is supported on a filter aid.

5. A process according to claim 1 comprising, prior to said contacting, coating a filter aid comprising substantially diatomaceous silica.

6. A process according to claim 1 comprising, prior to said contacting, coating a filter aid comprising substantially diatomaceous silica with said hydrous iron oxide precipitate in an amount sufficient to range from about 5 percent to about 50 percent of said precipitate by weight of coated filter aid.

7. A process according to claim 1 in which said water solution comprises substanitally effluent of secondary waste water treatment.

8. A process according to claim 1 in which said water solution is substantially free of undissolved organic matter.

9. A process according to claim 1, including separating said contacted water from said precipitate.

10. A process comprising particulating an iron ore to a particle size ranging from about 10 mesh to about 200 mesh, reacting surfaces of said particles with a strong mineral acid solution and thereafter treating said reacted surfaces with an alkaline material sufficiently to neutralize residual acid, whereby said iron ore surfaces are activated sufficiently to efficiently remove phosphate ions from water contacted with said activated surfaces.

11. A process according to claim 10, in which said iron ore is selected from the group consisting of hematite and magnetite, and in which during said reacting said acid is hot.

12. A process according to claim 11, in which during said reacting said acid ranges from about 60° C. upward to the boiling point of said acid solution, and including recovering said activated particles.

References Cited

UNITED STATES PATENTS

| | | | |
|---|---|---|---|
| 1,219,277 | 3/1917 | Farup | 252—472 X |
| 2,468,188 | 4/1949 | Frankenhoff | 210—75 |
| 3,142,638 | 7/1964 | Blaisdell et al. | 210—52 |
| 3,135,687 | 6/1964 | Jung et al. | 210—18 X |
| 3,377,272 | 4/1968 | Cann | 210—18 X |

OTHER REFERENCES

Preliminary Appraisal of Advanced Waste Treatment Processes, a publication of the U.S. Department of HEW, Public Health Service, Robert A. Taft Sanitary Engineering Center, Cincinnati, Ohio, September 1962, pp. 17 and 26 relied on.

U.S. Bureau of Mines Technical Report #709, pp. 173–178 relied on, 1948.

MICHAEL E. ROGERS, Primary Examiner

U.S. Cl. X.R.

23—200; 210—506; 252—472

PO-1050
(5/69)

UNITED STATES PATENT OFFICE
CERTIFICATE OF CORRECTION

Patent No. 3,499,837            Dated March 10, 1970

Inventor(s)  Karlis Laimonis Jaunarajs

It is certified that error appears in the above-identified patent and that said Letters Patent are hereby corrected as shown below:

In the specification, Column 2, line 22, "municipall" should be --municipal--; line 28, "hardness or" should be --hardness of--. Column 4, line 58, "witht" should be --with--. Column 5, lines 44-45, "phosplate" should be --phosphate--; line 48, "filted" should be --filter--. Column 6, line 11, Table 3, "3" should be --1--; line 12, "1" should be --2--; line 13, "2" should be --3--; line 42, "7.2" should be --7.2%--; line 49, "eliquot" should be --aliquot--. Column 8, line 9, Table 6, "0.5" should be --1.0--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents